3,047,799
INTERFERENCE-FREE PROBE APPARATUS FOR TESTING INSULATED ELECTRIC CONDUCTORS
Robert W. Peer and David Eigen, Passaic, N.J., assignors to The Okonite Company, Passaic, N.J., a corporation of Delaware
Filed Apr. 13, 1960, Ser. No. 21,911
5 Claims. (Cl. 324—54)

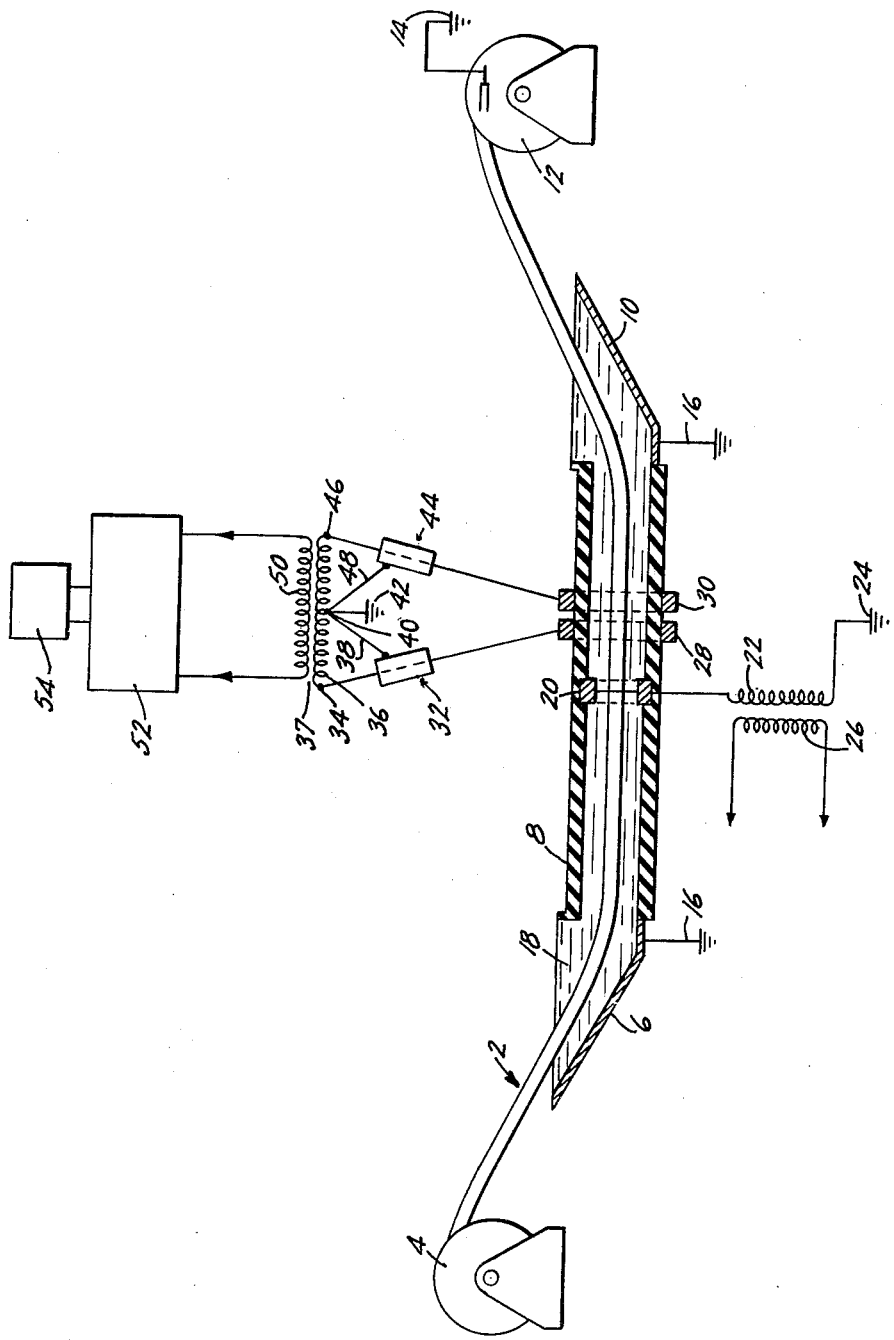

Our invention is directed to interference-free probe apparatus for testing electrically insulated conductors, such as electrically insulated wire and cable, to detect deleterious occlusions within the same.

More specifically, our invention provides an apparatus by which the article under test is progressively examined, this apparatus being of such a character that we are able to examine or test the article on a point-by-point basis so that no deleterious occlusion will go through undetected and to pinpoint the occlusion as to its location within the article.

Still more specifically, our invention provides an apparatus of the type just indicated wherein occlusions are detected by picking up electromagnetic signals radiating from the occlusions.

It will be appreciated that, while making such tests, atmospheric, static, and switching surge impulses or other interference originating outside the insulated article being tested may be encountered, and that these impulses can be picked up throughout the electromagnetic spectrum with approximately equal intensity and over the same frequency bands as the wanted signals from the article being tested. Tuned broadcast signals also will often interfere at specific frequencies. Inasmuch as the wanted signals, viz., the signals radiating from the occlusion, can not be amplified by conventional equipment without amplifying the interference signals, accurate detection of occlusions is impeded.

Accordingly, another object of our invention is to provide testing apparatus such as above briefly outlined wherein unwanted interference signals are cancelled, so that the wanted signals can be accurately detected with a high degree of sensitivity undisturbed by extraneous, unwanted interfering signals.

The accompanying drawing illustrates in part section and in part elevation one form of apparatus suitable for the corona-testing of the insulation of electric conductors in accordance with our invention.

Referring to the drawing in detail, 2 designates an insulated electric conductor the insulation of which is to be tested for occlusions within the same. In conducting a test, the conductor is continuously advanced from a let-off reel 4 through a metal tank 6, through a tube 8 of insulating material, and through a metal tank 10 to take-up reel 12. The conductor is grounded, as indicated at 14, and the two tanks 6 and 10 are also grounded, as shown at 16. The two tanks 6 and 10 and the tube 8 contain a body of semi-conducting fluid 18, such as distilled water, for example.

Within the insulating tube 8 is an electrode 20, which may take any suitable form, such as a metal ring, for instance. This electrode is connected to one terminal of the secondary 22 of a high-tension, alternating-current transformer, the other terminal of this winding being grounded, as shown at 24. The primary winding 26 of this transformer is connected to a suitable source of alternating-current electrical energy.

It will be appreciated that, in conducting a test, the insulation of the conductor will be progressively subjected to progressively increasing electrical stress as the conductor is advanced through the fluid 18 toward the electrode 20, so that the walls of any occlusion within the insulation will be electrically stressed, the stress rising progressively as the occlusion advances and reaching maximum value when the occlusion has reached the electrode 20. The voltage delivered by the transformer winding 22 is sufficiently high to cause corona to occur at the occlusion during advance of the occlusion toward the electrode 20, and this corona will persist until the occlusion has passed far enough beyond the electrode for the stress on the walls of the occlusion to have dropped to corona-extinction value.

At the voltage point in the path of travel of the insulated conductor where corona is to be measured, we provide a probe structure, illustrated as comprising two identical annuli, in the form of metallic rings 28 and 30, placed around the insulating tube 8 in close proximity to each other.

The center conductor of a coaxial lead 32 is connected at one end to the probe ring 28 and at its other end to one terminal 34 of a center-tapped transformer winding 36 of transformer 37. The shield of the coaxial lead 32 is connected by a lead 38 to the center tap 40 of the transformer winding 36. This tap is grounded, as shown at 42.

44 designates a coaxial lead identical with the lead 32, the center conductor of this lead being connected at one end to the probe ring 30 and at its other end to the other terminal 46 of the transformer winding 36. The shield of the lead 44 is connected by the lead 48 to the center tap 40 of the transformer winding 36. The secondary 50 of the transformer 37 is connected to the first stage of a conventional amplifier 52.

By using coaxial leads 32 and 44 of the proper capacity to tune with the inductance of the transformer 37, it will be appreciated that the transformer may be made resonant to the same frequency as the amplifier if a tuned amplifier is used. The transformer also serves to match the impedance of the first stage of the amplifier 52 to the signal source.

The output of the amplifier 52 is connected to an indicating or recording device 54, hereinafter referred to as a transducer. This device is to be activated by the signals radiating from the stressed occlusion, these signals being picked up by the probe rings, amplified, and passed to the transducer. Inasmuch as the amplifier 52 and the transducer 54 are well known types of equipment, they have not been illustrated in any detail.

Because of the identical size, shape, and geometric orientation of the two probe rings 28 and 30 and their close proximity to each other, any interference signals originating from without the insulation being tested, while the test is being conducted, will impinge equally on the two probe rings, but since these signals are introduced in opposing phases into the primary, center-tapped transformer winding 36 of the transformer 37, they will cancel, so that operation of the transducer is unaffected by these disturbances.

It will also be appreciated that for the major portion of the test many turns of the cable under test may be wound on reel 12 presenting an inductance between the conductor of the cable under test at any point between reels 4 and 12, and the place 14 where the conductor is grounded. It is advantageous to use a transformer 37 and an amplifier 52 sensitive to a high frequency. The inductive reactance of the cable wound on the reel at this high frequency may prevent interference which impinges on the cable conductor from shunting to ground, thereby allowing the interference to couple by capacity to the probe rings. However, since the rings are each coupled to the cable conductor by the same amount of capacity, they pick up equal amounts of interference signal in the same phase from the cable conductor. There interference signals are introduced into the primary 36 of the center-tapped transformer 37 and cancel, so that the operation of the transducer is unaffected by these disturbances.

It will also be appreciated that any corona signal picked up by probe ring 28 from the occlusion but not picked up by probe ring 30 will be transformed to the secondary of the transformer 37 and fed to the transducer without opposition. It will be equally apparent that any corona signal picked up from the occlusion by probe ring 30 but not picked up by probe ring 28 will be transformed to the secondary of the transformer 37 and fed to the transducer without opposition.

In conducting a test, we shall assume that the insulated conductor is being advanced from left to right as viewed in the drawing, and that the voltage delivered by the transformer winding 22 is sufficiently high to cause corona to form at a deleterious occlusion within the insulation before or by the time the conductor has advanced sufficiently to bring the occlusion abreast of the electrode 20.

As the stressed occlusion nears the probe ring 28, this ring will pick up the corona signals from the occlusion, the signals increasing in amplitude until the occlusion is within the ring, at which position of the occlusion signal amplitude is maximum. The probe ring 30, which is slightly beyond the ring 28, will also begin to pick up corona signals from the occlusion, and these signals will increase in amplitude until the occlusion is within this ring, at which time the amplitude of these signals is maximum.

It will be appreciated, therefore, that, because the two probe rings 28 and 30 are spaced from each other, the pickup of ring 28 will predominate until the occlusion is midway between the two probe rings; that at the midway point the response of the ring 28 equals the response of the ring 30; and that thereafter the response of ring 30 will predominate.

Due to the spacing of the probe rings 28 and 30 and the nature of the insulated conductor 2 and semi-conducting fluid 18, the corona signals will not be picked up in the same phase by the two rings, except when the occlusion is midway between the rings, so that, despite the fact that the rings are connected to opposite ends of the transformer winding 36, a corona signal picked up by one ring will not subtract appreciably from a larger signal picked up by the other ring, so that the transducer will be activated. When the occlusion is midway between the two probe rings, however, the signals picked up by the rings are in phase and are equal in amplitude, and, inasmuch as the two rings are connected to opposite ends of the center-tapped primary winding of the transformer 37, magnetic fields equal in magnitude but 180° phase-displaced will be set up in the transformer core, resulting in a sharp dropout in signal across the secondary 50 of the transformer. This dropout in signal when the occlusion is midway between the probe rings will be reflected in deactivation of the transducer, serving to accurately pinpoint the site of the occlusion.

From all of the foregoing it will be seen that our invention provides apparatus for testing electrically insulated conductors to detect the presence of deleterious occlusions therein, this apparatus being of such construction as to be interference-free, so that accurate testing is unimpeded. It will be appreciated also that the apparatus is of such construction that the site of the occlusion within the insulation can be pinpointed.

It is to be understood that changes may be made in the details of construction and arrangement of parts hereinabove described within the purview of our invention.

What we claim is:

1. Interference-free probe apparatus for testing electrically insulated conductors to detect deleterious occlusions within the same, said apparatus comprising, in combination, a pair of spaced probes; means for longitudinally advancing the insulated conductor successively past said probes; means for progressively subjecting the advancing conductor insulation to progressively increasing electrical stress to cause corona to form at the occlusion, both probes being responsive to the radiating occlusion; a transducer; circuitry for feeding the said response of said probes to the transducer to effect activation of the transducer, said probes being simultaneously and equally responsive to interference originating from sources other than the insulated conductor; and circuitry for adjusting the relative phase of the interference signals from the probes so that these interference signals oppose and cancel each other, whereby activation of the transducer is confined to the response of the probes to the radiating occlusion.

2. Interference-free probe apparatus for testing electrically insulated conductors to detect deleterious occlusions within the same, said apparatus comprising, in combination, a pair of spaced probes; means for longitudinally advancing the insulated conductor successively past said probes; means for progressively subjecting the advancing conductor insulation to progressively increasing electrical stress to cause corona to form at the occlusion, both probes responding simultaneously to the radiating occlusion; a transducer; circuitry for feeding the response of said probes to the transducer to activate the same, said probes responding simultaneously and equally to interference originating from sources other than the conductor under test; and circuitry for adjusting the relative phase of the interference signals from the probes so that these signals oppose and cancel each other, whereby activation of the transducer is confined to the response of the probes to the radiating occlusion.

3. Interference-free probe apparatus for testing electrically insulated conductors to detect deleterious occlusions within the same, said apparatus comprising, in combination, means for advancing the insulated conductor longitudinally; means for progressively subjecting the conductor insulation to progressively increasing electrical stress to cause corona to form at the occlusion; a pair of probes, identical in size, shape, and geometrical orientation, responsive to the radiating occlusion and so relatively disposed as to respond simultaneously but unequally to the radiating occlusion, except when the occlusion is equidistant from the two probes, at which time the probe responses are equal; a transducer; circuitry for feeding the response of said probes to said transducer to activate the same, said probes being simultaneously and equally responsive to interference originating from sources other than the conductor under test; and circuitry for adjusting the relative phase of the interference signals from the probes so that these signals oppose and cancel each other, whereby activation of the transducer is confined to the response of the probes to the radiating occlusion.

4. Interference-free probe apparatus for testing electrically insulated conductors to detect deleterious occlusions within the same, said apparatus comprising, in combination, a pair of spaced, annular probes; means for longitudinally advancing the conductor through said probes while progressively subjecting the conductor insulation to sufficiently high electrical stress to cause corona to form at the occlusion, both probes responding simultaneously to the radiating occlusion; a transducer; circuitry for feeding the response of said probes to the transducer to activate the same, said probes being so relatively disposed as to respond simultaneously and equally to interference originating from sources other than the conductor under test; and circuitry for adjusting the relative phase of the interference signals from the probes so that these signals oppose and cancel each other, whereby activation of the transducer is confined to the response of the probes to the radiating occlusion.

5. Interference-free probe apparatus for testing insulated electric conductors to detect deleterious occlusions within the same, said apparatus comprising, in combination, means for advancing the insulated conductor longitudinally while progressive subjecting the conductor insulation to progressively increasing electrical stress to cause corona to form at an occlusion within the insulation; a pair of probes positioned to be responsive to the radiating occlusion, said probes being responsive at all times simultaneously and equally to interference originating at sources other than the insulated conductor being tested, said probes being identical in size, shape, and geometrical orientation and spaced from each other in the direction of advance of the insulated conductor, whereby the signals picked up by the two probes will be unequal in phase and amplitude at all positions of the occlusion other than midway between the two probes, response of the probes when the occlusion is in midway position being equal in phase and amplitude; a transducer; a transformer having a center-tapped primary winding; means electrically connecting one of said probes to one terminal of said center-tapped winding and to the center-tap of the winding; means for electrically connecting the other probe to the other terminal of the said center-tapped winding and to the center-tap of the winding; a secondary for said transformer; and circuitry for feeding the output of said secondary to said transducer to activate the same.

References Cited in the file of this patent

UNITED STATES PATENTS

| | | |
|---|---|---|
| 2,170,813 | Doble et al. | Aug. 29, 1939 |
| 2,362,372 | Halfman | Nov. 7, 1944 |
| 2,712,112 | Weeks | June 28, 1955 |
| 2,794,170 | Gooding | May 28, 1957 |